United States Patent [19]
Szeles et al.

[11] Patent Number: 5,626,139
[45] Date of Patent: May 6, 1997

[54] TYMPANIC THERMOMETER

[75] Inventors: Donald M. Szeles, Ann Arbor; Walter Rubinstein, Southfield, both of Mich.

[73] Assignee: Artech Industries, Inc., Keego Harbor, Mich.

[21] Appl. No.: 311,642

[22] Filed: Sep. 23, 1994

[51] Int. Cl.$^6$ .............................. A61B 5/00; A61B 6/00; G01J 5/16
[52] U.S. Cl. .......................... 128/664; 374/131; 374/133; 128/736
[58] Field of Search ..................... 374/131, 133, 374/130; 128/664, 736

[56] References Cited

U.S. PATENT DOCUMENTS

| | | | |
|---|---|---|---|
| 4,722,612 | 2/1988 | Junkert et al. | 374/133 |
| 4,895,164 | 1/1990 | Wood | 128/736 |
| 4,932,789 | 6/1990 | Egawa et al. | 374/133 |
| 5,012,813 | 5/1991 | Pompei et al. | 374/130 |
| 5,017,018 | 5/1991 | Iuchi et al. | 128/736 |
| 5,159,936 | 11/1992 | Yelderman et al. | 128/736 |
| 5,167,235 | 12/1992 | Seacord et al. | 374/131 |
| 5,325,863 | 7/1994 | Pompei | 128/736 |
| 5,368,038 | 11/1994 | Fraden | 374/131 |

FOREIGN PATENT DOCUMENTS

| | | | |
|---|---|---|---|
| 404109928 | 4/1992 | Japan | 128/736 |
| 406142061 | 5/1994 | Japan | 128/736 |

*Primary Examiner*—Diego F. F. Gutierrez
*Attorney, Agent, or Firm*—Gifford, Krass, Groh, Sprinkle, Patmore, Anderson & Citkowski

[57] ABSTRACT

An improved tympanic thermometer incorporates twin thermopiles, each including a set of sensing junctions and a set of reference junctions configured so that three of the four sets of junctions sense only the temperature of an ambient environment, while the fourth set of junctions receives energy from both the ambient environment and from the tympanic membrane of a patient whose temperature is being taken. The energy received from the tympanic membrane is intentionally not bandwidth limited, enabling an accurate temperature measurement to be calculated which is substantially independent of wavelength. A light pipe is optionally included to assist in carrying radiation from the tympanic membrane to the fourth set of thermocouple junctions used for temperature sensing. In the preferred embodiment a dielectric coating is internally applied within the light pipe, and interchangeable tubes may be provided which conform to the aural physiology of different patients, including children.

9 Claims, 5 Drawing Sheets

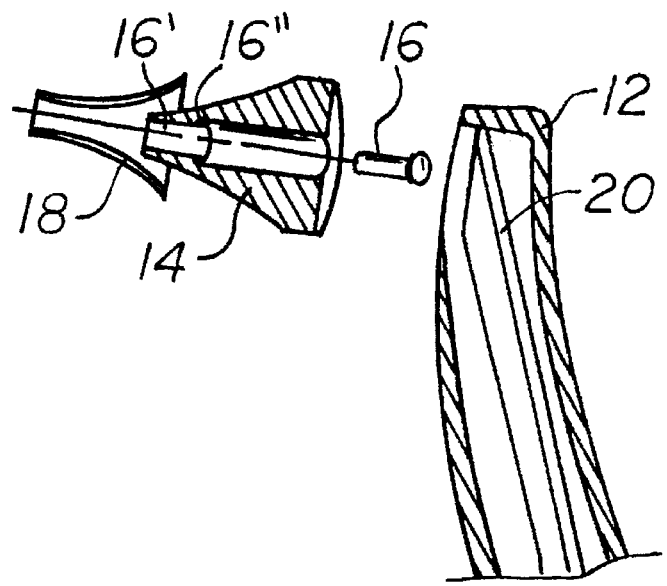
*FIG—4*
*(PRIOR ART)*
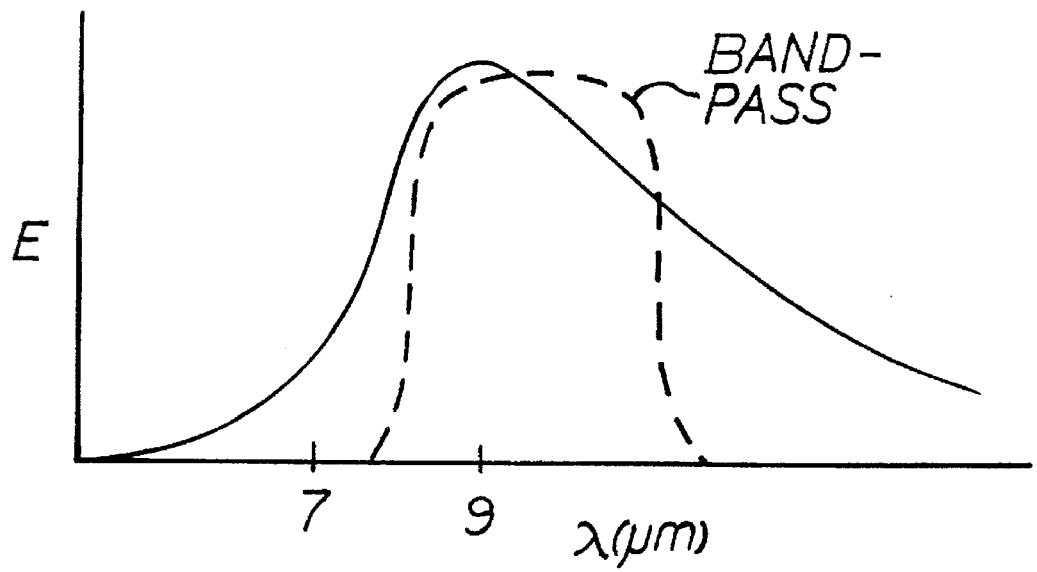
*FIG—5*

TYMPANIC THERMOMETER

FIELD OF THE INVENTION

The present invention relates generally to human temperature measurement and, more particularly, to a tympanic thermometer utilizing a dual thermopile temperature sensor and a light-conductive element to guide thermal energy from a patient's tympanic membrane to the sensor.

BACKGROUND OF THE INVENTION

Although conventional glass vial-type thermometers are inexpensive and sufficiently accurate for most purposes, such thermometers present risks in the form of cross-contamination and ingestion of the thermal expansion fluid in the event of glass breakage. As this fluid is typically mercury, the risk is particularly dangerous. The advantages of tympanic temperature measurement are well known, and thermometers based upon this approach are becoming increasingly popular. With a tympanic thermometer, a thermal detector is used to sense the heat generated by the tympanic membrane (the eardrum) using a device having a speculum which fits into the ear canal to perform the measurement. The advantages of this technique are many, including comfort without the need for patient cooperation coupled with fast and accurate readings, assuming the instrument is properly designed.

The accuracy of a tympanic instrument is largely dependent upon the temperature sensing element exposed to the tympanic membrane, and, to a lesser extent, on the algorithm used to compute temperature given the level of thermal energy sensed by the detector element. In terms of non-contact tympanic temperature measurement, the most popular sensing elements include pyroelectric and thermopile detectors. Thermoscan, Inc. of San Diego, Calif., for example, now offers a tympanic thermometer based upon the pyroelectric effect.

More recently, thermopile-based detectors have gained in popularity as techniques have emerged to thermally stabilize such detectors; that is, to compensate for unwanted variations associated with the ambient environment. Yelderman et al (U.S. Pat. No. 5,159,936) "Non-Contact Infrared Tympanic Thermometer," provides a useful background concerning techniques used to thermally stabilize thermopile detectors in general, including approaches used in tympanic temperature measurement in particular.

As discussed in the Yelderman reference above, a thermopile compensation technique which has been known for some time involves the use of multiple thermocouple junctions, certain of which are exposed to the ambient environment in the immediate vicinity of the junctions, while other junctions are shielded from the radiating body to be measured, thus producing an output signal which is less susceptible to undesirable ambient variation. The specific implementations of Yelderman et al regarding this general approach leave certain issues unresolved, however. For one, it is unclear from this reference whether the multiple thermocouple junctions form part of a two-channel detector or a two-element detector. With a two-channel detector, a single thermopile is used and only one set of its junctions (hot or cold) are shielded from the incoming radiation so as to produce an output signal. With a two-element detector, on the other hand, two complete thermocouples are used, with the cold or reference junctions being thermally bonded to a common substrate, with only one set of the hot junctions being shielded with respect to the incoming radiation, resulting in a configuration which may be less susceptible to ambient variation.

Although the Yelderman patent makes reference to dual-element detectors, certain of the descriptions and figures teach away from the use of such a detector in the specific embodiment respecting tympanic temperature measurement, instead implying the use of a dual-channel implementation. For example, the detector in Yelderman is intentionally placed at the distal end of the speculum, presumably to position it in closer proximity to the tympanic membrane. Additionally, the shielding of one half of the sensing element is placed on the window of the element housing and distanced away from the thermocouple junctions. This increases the extent to which all junctions are exposed to the ambient environment and implies the use of a dual-channel as opposed to a dual-element sensor. Such a configuration also discourages the use of an optical guide or "light-pipe" between the temperature sensor and the tympanic membrane, first because Yelderman leaves no room for such an element, but additionally, the use of a light pipe would cause the radiation to be considerably more multidirectional than if derived directly from the tympanic membrane, which would result in pronounced leakage around the blocking element, thus leading to an erroneous reading. In certain applications, however, such a light-pipe may be essential to an accurate reading given the physiology of different individuals, particularly children. Additionally, Yelderman et al prescribes the use of a bandpass filter to pass only wavelengths in a range corresponding to emissions representative of the internal temperature of a human being. However, such a bandpass filter may be undesirable when particular calculations are used to derive a final temperature value. For example, if the integral of energy received is used as the basis for the calculation, band limiting causes the integral equation to remain dependent upon wavelength, which may result in inaccurate approximations. By receiving the total unimpeded radiation from the tympanic membrane, a more straightforward integral may be used which is independent of wavelength.

SUMMARY OF THE INVENTION

The present invention improves upon existing tympanic thermometers by providing a temperature sensor incorporating dual, physically symmetrical thermopiles, each including a set of sensing junctions and a set of reference junctions, for a total of four sets of junction. The two thermopiles are connected in electrical opposition and configured so that three of the four sets of junctions sense only the temperature of an ambient environment, while the fourth set of junctions receives energy from both the ambient environment and from the tympanic membrane of a patient whose temperature is being taken. The energy received from the tympanic membrane is intentionally not bandwidth limited, enabling an accurate temperature measurement to be calculated which is substantially independent of wavelength. The preferred calculation is based upon the expression $$E_{Target} = K(T_T^4 - T_A^4)$$

where K is a constant, $T_T$ is the temperature of the tympanic membrane and $T_A$ is the temperature of the ambient or case temperature, where the temperature values are in degrees absolute.

A light-carrying conduit is alternatively included to assist in carrying radiation from the tympanic membrane to the fourth set of junctions used for temperature sensing. In the preferred embodiment this light-carrying conduit is constructed in the form of a rigid tube having an internal dielectric coating. Such a coating may be deposited within tubing smaller than that possible with metallic coatings, thus facilitating interchangeable tubes conforming to the aural physiology of different patients, including children. In the preferred configuration, all of the junctions are exposed to an ambient environment developed within a thermally conductive housing which is external to the aural canal of the patient, with the light-carrying conduit being thermally isolated from this thermally conductive housing.

A tympanic thermometer according to the invention includes a hand-held enclosure supporting a user control and a temperature display, with dual-thermopile temperature sensing element being disposed within the enclosure. Control means are also provided within the enclosure, the control means being in electrical communication with the user control, the display, and the temperature sensing element, the control means being operative to receive a signal from the temperature sensing element and compute a temperature value based upon the energy received from the patient's tympanic membrane.

BRIEF DESCRIPTION OF THE DRAWINGS

FIG. 4 is a side-view cross-sectional drawing of the speculum area of a prior-art tympanic thermometer;

FIG. 5 is a set of curves indicating energy radiated as a function of wavelength relative to the human body, including the effect of a bandpass filter;

DETAILED DESCRIPTION OF THE PREFERRED EMBODIMENT

Figure 1:
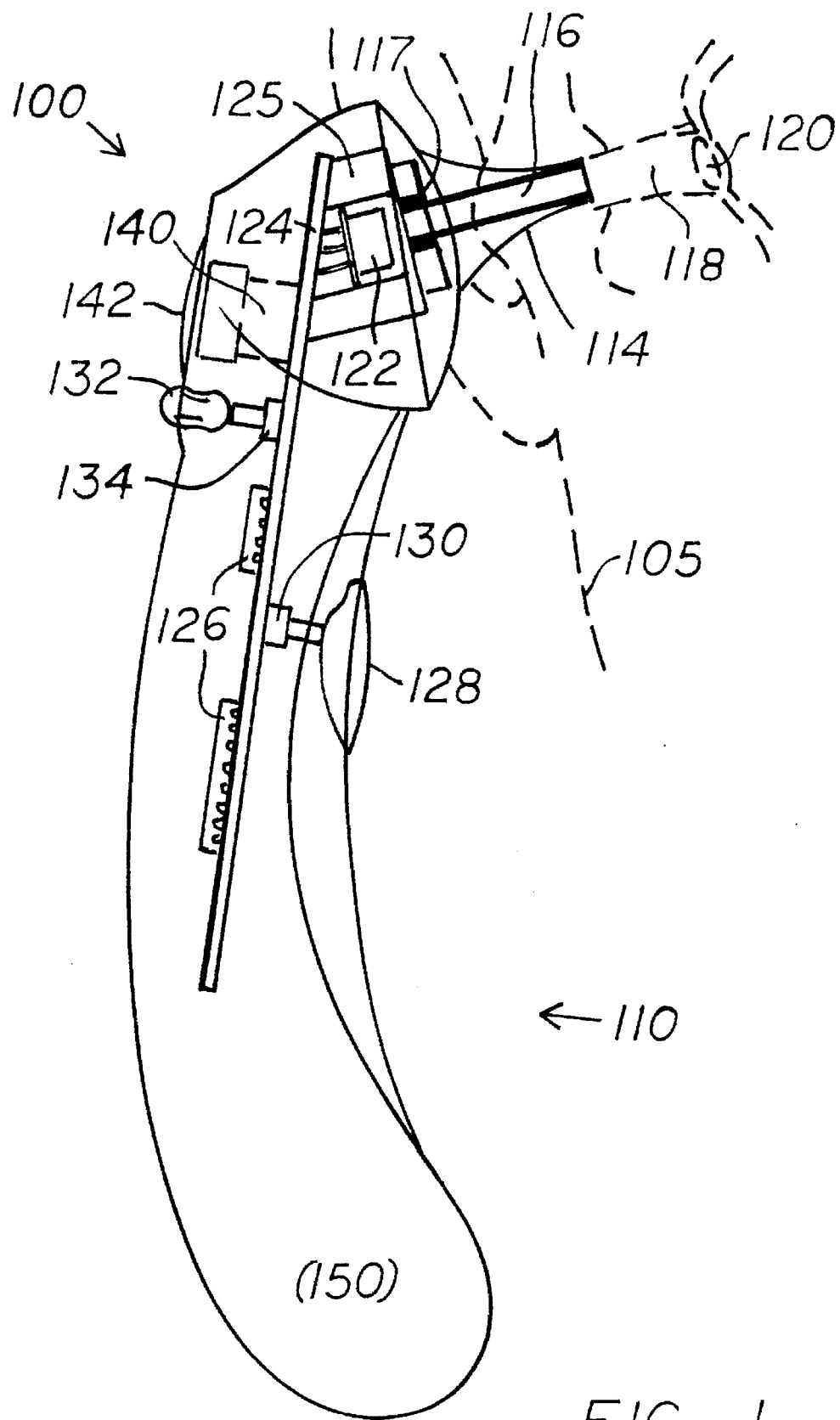
FIG. 1 is a side view of a tympanic thermometer constructed according to the invention which illustrates major internal components, the thermometer being in position to perform a temperature measurement.

FIG. 1 shows generally at 100 a side view of tympanic thermometer constructed according to this invention. An outline is used to indicate the overall shape of the instrument, and certain internal components are shown exposed through the case. Overall, the instrument includes a proximal portion 110 configured for convenient grasping in the hand, and a distal portion having a speculum 114, which is shown inserted into the ear canal 118 of a patient depicted with broken lines 105. In position, an energy path is formed between the tympanic membrane 120 of a patient and a preferred temperature sensing element 122 which will subsequently be described separately and in considerable detail. An energy carrying passageway 116 preferably includes a light-conductive element or light-pipe which will also be considered further below.

The detector element 122 is soldered to a printed circuit board 124 and is contained in a thermally conductive housing 125 preferably constructed of aluminum. A tube 116 is used as a light pipe to carry radiative energy from the tympanic membrane 120 to the detector 122, and is thermally insulated from the housing 125 using an annular ring of insulating material 117. Printed circuit board 124 also has attached to it various other components forming the electrical subsystem of the instrument, including integrated circuits 126 which are meant only as representations, and which, in the preferred embodiment, are of the surface-mount type to consume the least possible volume within the enclosure. A switch 130 mounted on board 124 interfaces to a mechanical button 128 to provide a first operational function such as a recall of a previous temperature reading. A second switch 134 interfaces to button 132 to provide a second operational feature, that being the initiation of a new reading. A display 140 is also mounted to board 124 which provides a readout of previous and current temperature readings and other optional information to the operator of the instrument through the window 142. In the section of the device shown generally at 150, batteries (not shown) are housed to provide operating power.

Figure 2:
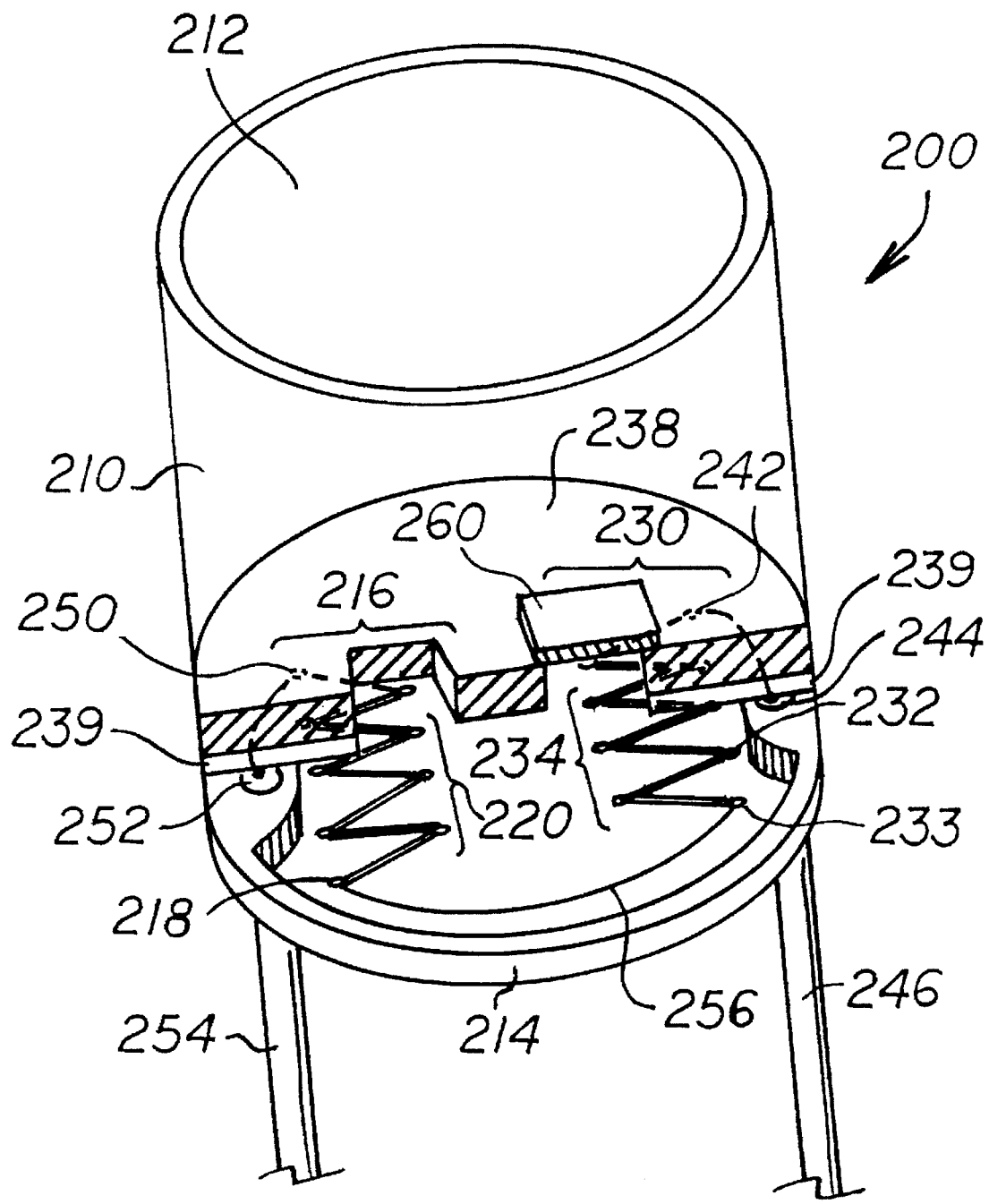
FIG. 2 is an oblique illustration of a preferred dual element thermopile temperature sensor used in the thermometer of FIG. 1, with portions of the internal structure being removed to reveal pertinent internal components.

FIG. 2 shows a dual thermopile detector element having a preferred configuration for use in tympanic temperature measurement. Shown generally at 200, the device includes a housing 210 having a window or aperture 212, and at least two electrical posts 246 and 254 which carry a signal to other components comprising the remaining portions of the electrical subsystem of the instrument. It should be noted that FIG. 2 is schematic in nature, and is not intended to depict exact physical relationships.

Broadly, the dual-element detector 200 includes a first thermally conductive substrate 214 used to support the electrical binding post 246 and 254 and to provide a peripheral surface for attachment of the housing 210 at its lower skirt. A second thermally conductive substrate 238 is supported above the lower substrate 214, and a very thin layer 239 of an electrically insulating material such as plastic is adhered to the bottom surface of the substrate 238. Each thermopile has a set of sensing or "hot" junctions and a set of reference or "cold" junctions, the reference junctions of each of the two thermopiles being bonded to the lower surface of this plastic insulating layer 239 such that an electrical short is avoided but intimate thermal communication is realized between both sets of reference junctions and the substrates, particularly the upper substrate 238. The first thermopile, shown generally in the vicinity of 216, includes a first set of sensing junctions 220 and a second set of reference junctions such as the junction 218. The second thermocouple depicted generally 230 includes a second set of sensing junctions 234 and reference junctions such as junction 232. To improve thermal sensitivity, an absorbing black material is preferably deposited onto both sets of sensing junctions 220 and 234. The reference junctions of the two thermopiles are connected in electrical opposition to one another at points 218 and 233 through a conductive element 256. The non-interconnected ends of each thermopile being connected to the posts 246 and 254 to develop a signal thereacross representative of sensed thermal energy. The thermocouples are preferably electrically and physically symmetrically matched, and consist of dissimilar materials as depicted by the alternate white and black stripes which make up each thermopile. Thermopile construction is generally well known in the art, and various references are available which describe those materials which are preferably used, how they are joined to one another, and so forth.

The substrates 214 and 238 are preferably composed of a highly thermally conductive material such as a berillium ceramic. The substrate 238 includes two generally squarish apertures, one associated with each set of sensing junctions of each thermopile. A thermal blocking window 260 is placed only over the sensing junctions 234 of the rightmost thermopile 230, as shown in FIG. 2. Without this optical block 260, however, it should first be noted that if both sets of sensing junctions 220 and 234 are equally illuminated through their respective apertures in washer 238, no electrical signal would ideally be generated across posts 254 and 256, assuming thermopiles 216 and 230 are connected in series electrical opposition and are physically identical. In such a case, both thermopiles would independently generate a voltage, but due to the series opposition configuration, these voltages would cancel out, much like two batteries placed with their positive or negative sides in electrical contact. The only output generated, if any, would be due to a mismatch between the two thermopile detectors, which, in fact, would be an undesirable artifact.

As mentioned, the sensing junctions 234 of the rightmost thermopile in FIG. 2 are now covered with a thermally conductive material 260, preferably a blank of aluminum bonded to the upper substrate 238. The purpose of this cover is to ensure that the sensing junctions now sense only the temperature of the washer 238 and all components in thermal contact with washer 238, including the substrate 214 and the case 210. Generally speaking, then, three sets of junctions now sense the ambient environment and only the ambient environment, those being both the hot and cold junctions of the right thermopile 230 and the cold or reference junctions of the left thermopile 216. Only the sensing junctions 220 of the leftmost thermopile 216 are now exposed to the external environment through the aperture 212, such that when the instrument of FIG. 1 when properly positioned, these junctions 220 are the only to sense energy radiated by the tympanic membrane. Given that all other junctions are exposed to ambient and that the two thermopiles 216 and 230 are connected in series electrical opposition, the configuration shown in FIG. 2 accordingly provides an electrical output across posts 254 and 256 accurately representative of energy received only from the radiative body of interest.

Figure 3:
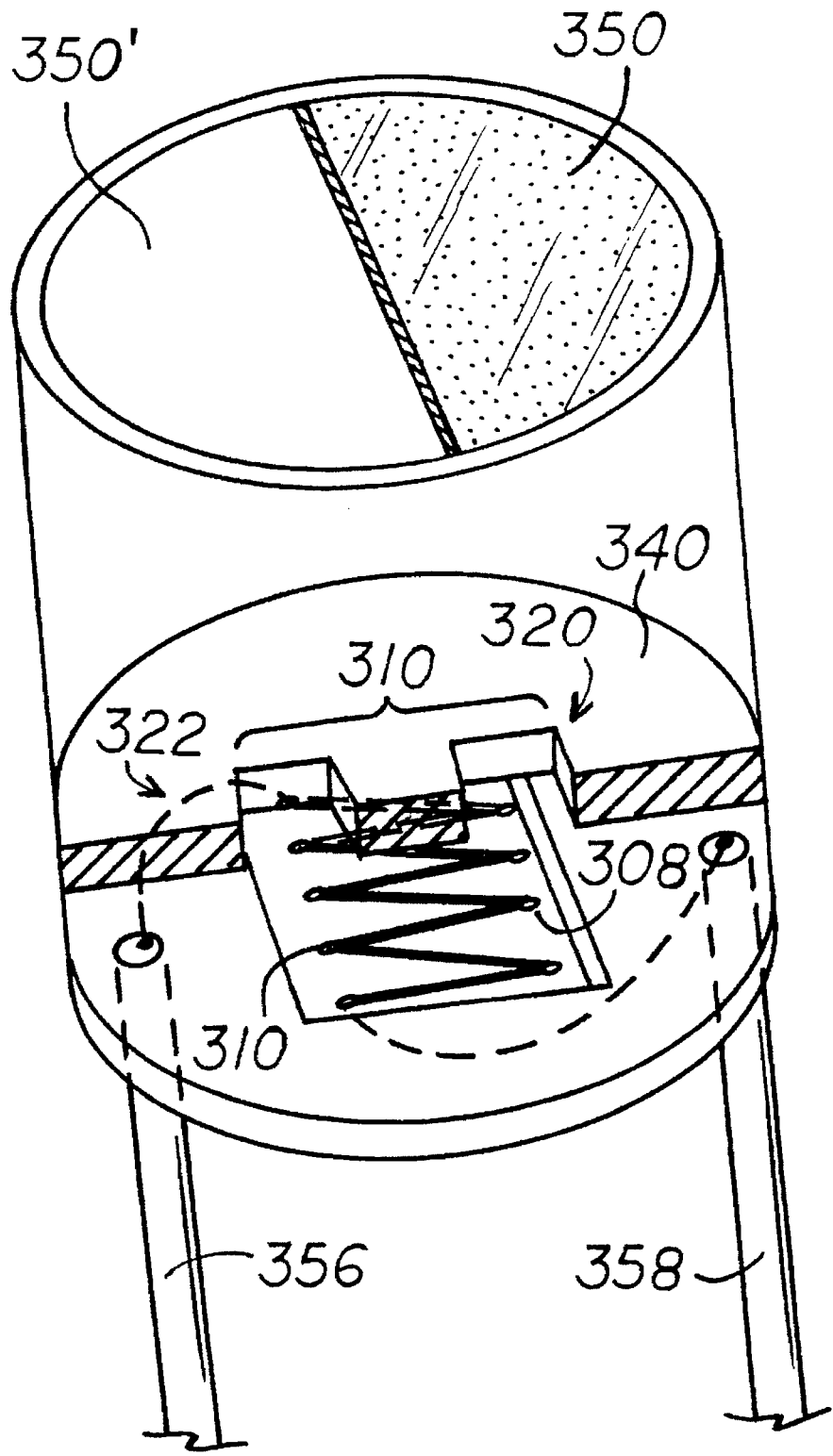
FIG. 3 is an oblique illustration of a dual channel thermopile temperature sensor which may alternatively be used for tympanic temperature measurement.

FIG. 2 is not the only possible thermopile configuration. FIG. 3, for example, illustrates an alternate prior-art configuration which uses a single thermopile 310 having a set of reference junctions such as 308 and a set of sensing junctions such as junction 310. The reference junctions are disposed under a first window 320 in a washer 340, whereas the reference junctions are disposed beneath a second window 322 in the substrate 340. As in the case of the detector used by the present invention described with reference to FIG. 2, radiation impinging on both the reference and sensing junctions will not produce an output signal since they are connected in series electrical opposition but, in this case, that series electrical opposition exists through the thermopile itself since both the reference and sensing junctions are "floating" and not referenced to any material or ambient environment in particular.

As in the case of FIG. 2, if one or the other sets of reference or sensing junctions is optically blocked, a signal will also be produced which is representative of the energy received by the set of junctions not deprived by the block element. For example, if a remote filter 350 is placed over one half of the device of FIG. 3 as shown, energy in a straight-line path with respect to the element will impinge only upon the leftmost junctions through aperture 322 and, assuming junctions on the right and left both "see" case temperature, and further assuming substantial physical symmetry therebetween, an output signal across posts 356 and 358 will indeed be produced. It should be noted in this alternative configuration that blocking element 350 may be a filter which does not provide a 100% block of the in-line radiation received. For example, with respect to the Yelderman patent previously referenced, this element 350 preferably blocks roughly 50% of the incoming radiation, which is desirable for several reasons. First, assuming the other half of the aperture 350' is simply an infrared transmitting window, without an anti-reflection coating this window will pass roughly 60% of the incident energy instead of 90%, which may encourage the use of a blocking element 350 having less than a 100% optical blocking capability as well. But additionally, however, an assumed efficiency of 50% may, in fact, lead to a more straightforward calculation, particularly given the limited performance of most commercially available microprocessors.

FIG. 4 shows a cutaway view of a non-contact infrared tympanic thermometer according to Yelderman et al. Within a housing 12 is preferably disposed a circuit board 20 having a processing circuit in operative communication with an optically stabilized thermopile detector 16 adapted to be received by a protruding probe portion 14 (preferably made of aluminum or plastic) for insertion into the patient's ear. A disposable speculum 18 is placed over the probe portion 14 before insertion of the probe into the auditory canal for a temperature measurement. It is clear from this figure that detector 16 is intended for placement as close as possible to the tympanic membrane of the patient; that is, during operation, detector 16 is apparently disposed at position 16' with the shoulder of the package resting against ridge 16". That the thermal detector 16 is to be placed at the distalmost portion of the protruding probe portion 14 presents several drawbacks, including a rise in overall ambient temperature proximate to the sensing elements, and a preclusion of the use of a light conductive element from the tympanic membrane into the detector package which, as mentioned previously. Another significant problem is that the packages within which such thermopile junctions are housed will not fit into the ear canal of smaller patients, for example, children.

It is known in the prior art to use hollow pipes as waveguides for the purpose of carrying radiation from the tympanic membrane to an appropriate sensor. Typically these pipes include internal gold plating to enhance energy throughput along the tube. U.S. Pat. No. 5,179,936 "Disposable Speculum With Membrane Bonding Ring" to O'Hara et al, for example, disposes such an internally gold-plated waveguide (20). The use of internal gold plating has its drawbacks, however, including high expense and difficulty in plating the walls of waveguides having very small internal diameters. When the internal diameter of such a waveguide is reduced below appropriately $\frac{3}{16}$", it is difficult to carry out an internal gold coating, particularly if the gold is delivered in the form of a liquid plating solution. Commercially available light pipes therefore also present the same problem associated with locating the detector element itself distally with respect to the speculum; that is, commercially available light pipes are simply too large to fit into the ear canals of patients having smaller ear canals. Therefore, in the preferred embodiment, tubes having a dielectric coating are alternatively used. Such light pipes are now being offered in $CO_2$ laser applications but have not, as yet, been used for temperature measurement applications such as human tympanic applications.

The use of a dielectric enables smaller diameter tubes to be coated, which allows thermometers and other apparatus making use of such an improved light guide to accurately function in new situations, including measurements respecting children. In the preferred embodiment, a rigid tube such as glass is used, with an internal coating tailored to reflect infrared radiation, particularly those wavelengths associated with human temperature measurement. To further enhance the light-piping effect multiple internal dielectric coatings may be used. As a result, the outside diameter of this internally dielectrically coated tube may be on the order of 1/80,000 of an inch and, through further development, may be constructed with smaller diameters as well.

Now turning to FIG. 5, there is shown a graph of energy versus wavelength for a human body as the radiator of the energy. At normal body temperature, the curved peaks at around 9.0 microns, as shown by the curve. By integrating over a large percentage of wavelengths, an ideal expression may be used to compute body temperature using the relationship that energy is proportional to temperature raised to the fourth power. It is important to consider wavelengths beyond those in and around the nine micron region since, as body temperature changes, the peak will shift with temperature variation. In prior-art devices utilizing the bandpass filter to pass only those wavelengths associated with body temperature, it is as though a wavelength window is placed on the curve, and if the curve is allowed to move from side to side as body temperature changes with this window being fixed, an inaccurate reading may result. In the present invention, such a bandpass filter is intentionally avoided enabling a direct calculation of temperature to be based upon energy using this simplified proportional relationship.

Figure 6:
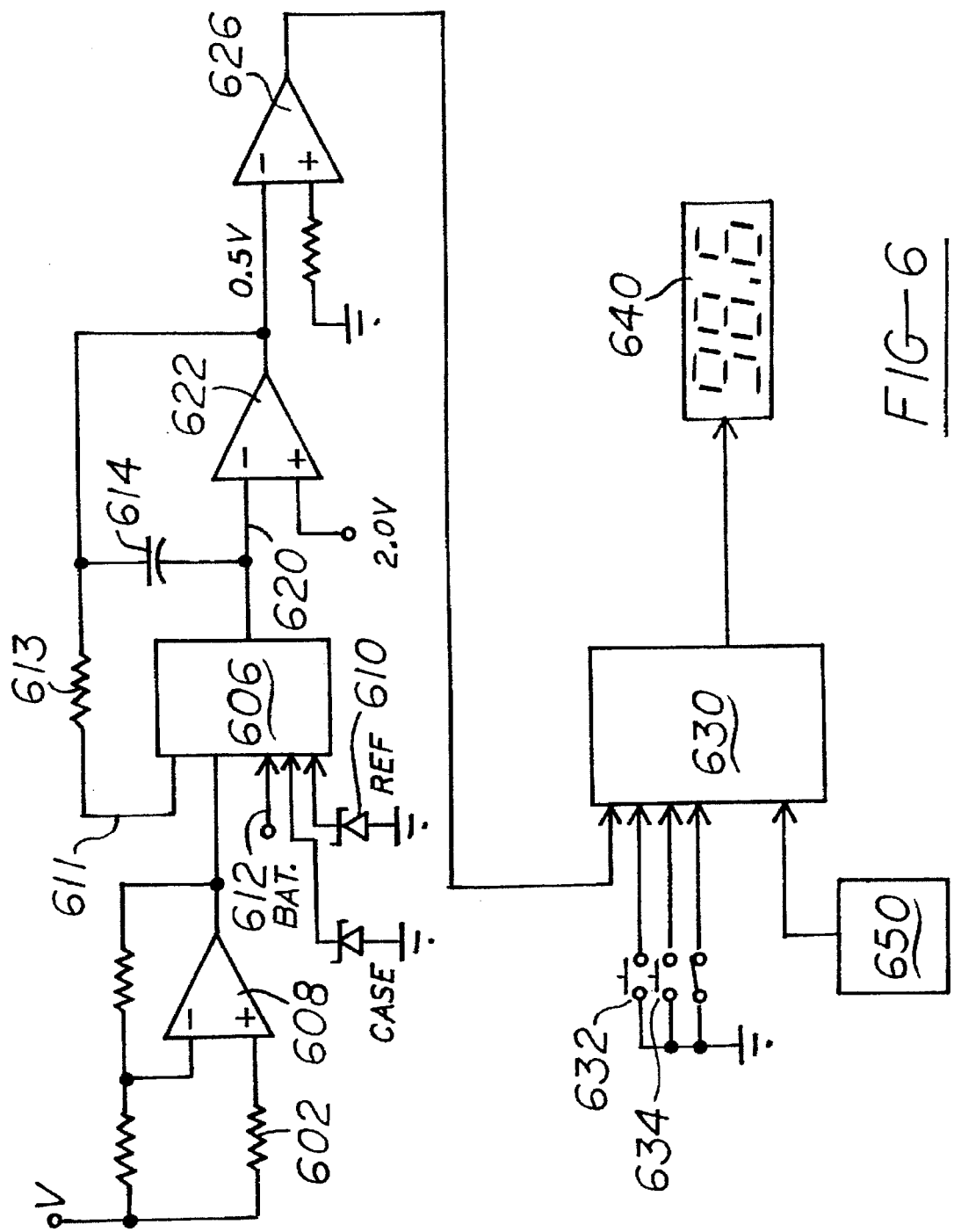
FIG. 6 is a schematic diagram used to show major electrical components associated with the operation of a tympanic thermometer constructed according to the present invention.

FIG. 6 illustrates in simplified schematic form the electrical components of the present invention of the tympanic thermometer. The series opposed dual thermopiles are shown at 602 which, in use, function as a voltage generator. This voltage is delivered to a chopper-stabilized amplifier 604, the output of which is fed into a multiplexing switch 606. The multiplexer 606 selects one of various inputs including a Zener reference input developed through diode 610. Other inputs to the multiplexer 606 include a battery voltage selector along line 612 and an input representative of case temperature. The output of the multiplexer switch 606 at line 620 forms one input to a integrator 622, the other input being a reference voltage, preferably 2.0 volts. The input 611 to the multiplexer switch 606 connects to a resistor 613 and a capacitor 614. At the initiation of a voltage reading, lines 620 and 611 are shorted, ensuring that the voltage across capacitor 614 is zero. Then multiplexer 606 chooses the input associated with the voltage to be measured, be it battery voltage, or temperature related, and capacitor 614 begins to charge. This charging process continues until the input to the inverting input of integrator 622 reaches the difference between the voltage present on the non-inverting input and the output of the integrator 622 which in one embodiment is 0.5 volts. Thus, the integration process continues until the voltage presented to the inverting input reaches 1.5 volts, at which time microprocessor element 630 terminates a counting process which will be described below. The output of the integrator 622 feeds an amplifier 626 which forms one input to a microprocessor element 630.

Switches 632 and 634 also form inputs to the microprocessor 630, switch 632 being associated with recalling a temperature associated with a previous reading, whereas switch 634 is associated with the initiation of a new measurement. Another switch 636 is used to choose between readings in Fahrenheit and readings in degrees Centigrade. The readings are provided on a display 640 in electrical communication with the processor element 630. As with other aspects of this description, various details are left out, including necessary driver transistors, pullup devices, current-limiting resistors, and so forth.

A non-volatile memory 650 is used to store correction factors associated with gain and case temperature. During calibration, a reference voltage of diode 610 is measured, as is the case temperature, using a separate instrument. The tympanic thermometer is pointed toward a known black body-radiator and a voltage reading is stored in the non-volatile memory 650 relating to that measurement. Given this black-body temperature measurement and an accurate reading of case temperature, a gain value is determined which is stored in the non-volatile memory 650. This gain value preferably takes all thermal obstacles into account, including the speculum used, the anti-reflection coatings within the light-pipe, and so forth. A correction factor is also stored since the instrument may be used to sense case temperature of a value slightly different than that used when the instrument is in actual operation. In the preferred embodiment, the non-volatile memory 650 is in the form of an electrically erasable programmable read-only memory (EEPROM), as such devices now maintain relatively large amounts of data in single chip form. While it may be possible to have the microprocessor 630 perform the calibration calculations just described, since such operations are carried out only once prior to shipment of the product, it may be advantageous to perform these calculations external to the instrument itself and later download them into the EEPROM.

To take a reading, button 634 is depressed, which provides an input signal to processor 630. The microprocessor then begins counting using pulses from a ceramic resonator clock 660, and multiplexer 606 chooses the output of amplifier 608, which it feeds along line 620 into comparator 622. A count continues until the voltage present at 622 is reached in accordance with the discussion above. This results in an output to device 626 which, in turn, amplifies the signal to be received by the processor 630. Using the count achieved when the signal is presented to the device 630, the processor calculates a temperature value based upon the proportionality relationship discussed previously, taking the correction factors into account.

Having thus described our invention, we claim:

1. A tympanic thermometer, comprising:
a hand-held enclosure supporting a user-control, a temperature display and elongated means for guiding radiation representative of tympanic temperature onto a sensor assembly within the enclosure, the sensor assembly further including:
dual, physically symmetrical thermopiles supported adjacent one another on the same substrate, each thermopile including a set of sensing junctions and a set of reference junctions, resulting in four sets of such junctions, the thermopiles being connected in electrical opposition, and
optical blocking means in physical contact with the substrate and in thermal proximity with three of the four sets of the thermopile junctions, so that the three blocked junctions sense only the temperature of the ambient environment while the fourth set of junctions receives radiation from the ambient environment and the radiation representative of tympanic temperature in a total and unimpeded path to allow an accurate temperature measurement to be calculated which is substantially independent of radiation wavelength.

2. The tympanic thermometer of claim 1, wherein the wavelength-independent calculation is based upon the expression $$E_{Target} = K(T_T^4 - T_A^4)$$

where $E_{Target}$ is energy received from the tympanic membrane, K is a constant, $T_T$ is the temperature of the tympanic membrane and $T_A$ is the temperature of the ambient or case temperature, the temperature values being in degrees absolute.

3. The tympanic thermometer of claim 1, wherein the elongated means for guiding the radiation representative of tympanic temperature further includes an elongated radiation-carrying conduit.

4. The tympanic thermometer of claim 3, wherein the elongated radiation-carrying conduit is in the form of a rigid having an internal dielectric coating.

5. The tympanic thermometer of claim 4, further including a speculum, and wherein the waveguide and speculum have external dimensions sufficiently small to comfortably suit child patients.

6. The tympanic thermometer of claim 3, further including specula interchangeably placeable over the radiation-carrying conduit, each speculum having an outer surface which conforms to a patient's aural physiology.

7. A tympanic thermometer, comprising:

a hand-held enclosure supporting a user control and a temperature display;

a temperature sensing element supported in the enclosure, the element including:

two thermopiles supported adjacent one another on the same substrate and connected in series electrical opposition, each thermopile including a plurality of sensing junctions and a plurality of reference junctions, the sensing junctions of each thermopile being disposed in a thermal path with respect to the tympanic membrane, the reference junctions of each thermopile being in intimate thermal contact with a common, thermally conductive substrate, and a thermally conductive blocking element placed in the thermal path of the sensing junctions of only one of the two thermopiles, the blocking element being supported in close physical proximity to the junctions which it blocks and also in intimate physical and thermal contact with the common, thermally conductive substrate and reference junctions of both thermopiles;

an elongated waveguide disposed in the thermal path to assist in guiding radiation from the tympanic membrane toward the sensing junctions of the two thermopiles; and control means disposed within the enclosure, the control means being in electrical communication with the user control, the display, and the temperature sensing element, the control means being operative to receive a signal from the temperature sensing element and compute a temperature value according to the relationship:

$$E_{Target} = K(T_T^4 - T_A^4)$$

where $E_{Target}$ is energy received from the tympanic membrane, K is a constant, $T_T$ is the temperature of the tympanic membrane and $T_A$ is the temperature of the ambient or case temperature, where the temperature values are in degrees absolute.

8. The tympanic thermometer of claim 7, further including interchangeable elongated waveguides having differing cross-sectional dimensions to suit the physiology of different patients.

9. The tympanic thermometer of claim 7, wherein the elongated waveguide takes the form of an elongated hollow tube having a dielectrically coated interior wall.

* * * * *